(12) United States Patent
Maeda

(10) Patent No.: US 9,410,584 B2
(45) Date of Patent: Aug. 9, 2016

(54) VEHICLE CONTROL APPARATUS

(71) Applicant: DENSO CORPORATION, Kariya, Aichi-pref. (JP)

(72) Inventor: Shigeru Maeda, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/793,290

(22) Filed: Jul. 7, 2015

(65) Prior Publication Data

US 2016/0017939 A1  Jan. 21, 2016

(30) Foreign Application Priority Data

Jul. 17, 2014 (JP) .................................. 2014-146399

(51) Int. Cl.
| | |
|---|---|
| *B60W 10/02* | (2006.01) |
| *B60W 10/06* | (2006.01) |
| *B60W 10/184* | (2012.01) |
| *F16D 43/28* | (2006.01) |
| *B60W 30/18* | (2012.01) |

(52) U.S. Cl.
CPC ......... *F16D 43/28* (2013.01); *B60W 30/18072* (2013.01); *B60W 2030/1809* (2013.01); *B60W 2510/06* (2013.01); *B60W 2710/021* (2013.01)

(58) Field of Classification Search
None
See application file for complete search history.

(56) References Cited

U.S. PATENT DOCUMENTS

| | | | | |
|---|---|---|---|---|
| 5,480,363 | A * | 1/1996 | Matsubara | ............ F16H 61/143 |
| | | | | 477/63 |
| 2007/0102208 | A1* | 5/2007 | Okuda | ..................... B60K 6/48 |
| | | | | 180/65.31 |
| 2012/0220422 | A1* | 8/2012 | Wurthner | .............. B60W 10/02 |
| | | | | 477/79 |

FOREIGN PATENT DOCUMENTS

JP     2011-219087 A     11/2011

* cited by examiner

*Primary Examiner* — Edwin A Young
(74) *Attorney, Agent, or Firm* — Oliff PLC

(57) ABSTRACT

A vehicle control apparatus includes a first control section that shifts a vehicle from a normal running state to a coasting state by disengaging the clutch device of the vehicle when a predetermined execution condition is satisfied, a second control section that releases the coasting state when a brake operation or an accelerator operation is performed by a vehicle driver while the vehicle is in the coasting state, and an operation amount determination section that determines whether or not an operation amount of a brake operation or an accelerator operation performed while the vehicle is in the coasting state exceeds a release threshold. The second control section releases the coasting state if the operation amount is determined to exceed the release threshold, and does not release the coasting state if the operation amount is determined not to exceed the release threshold.

10 Claims, 6 Drawing Sheets

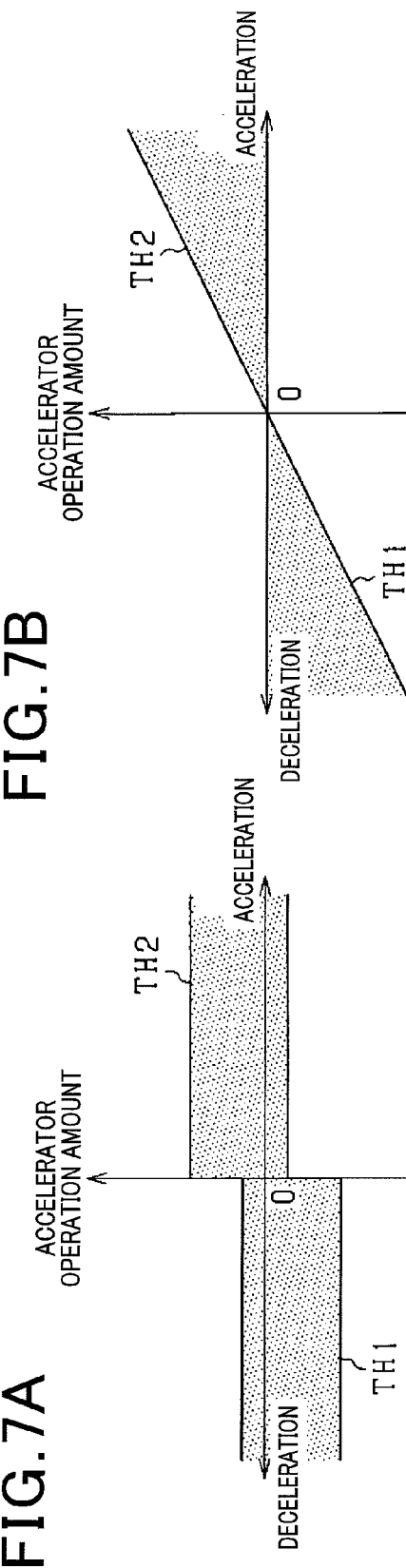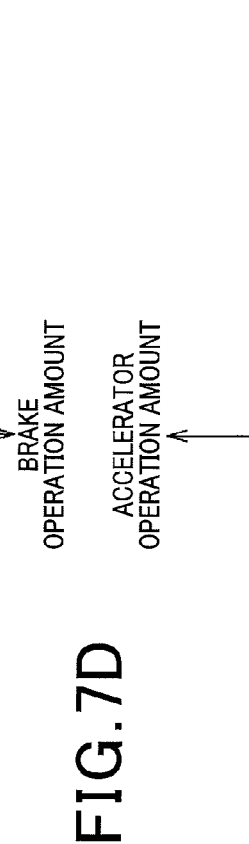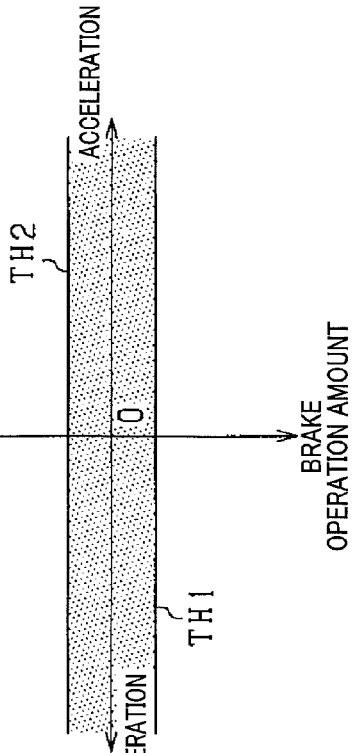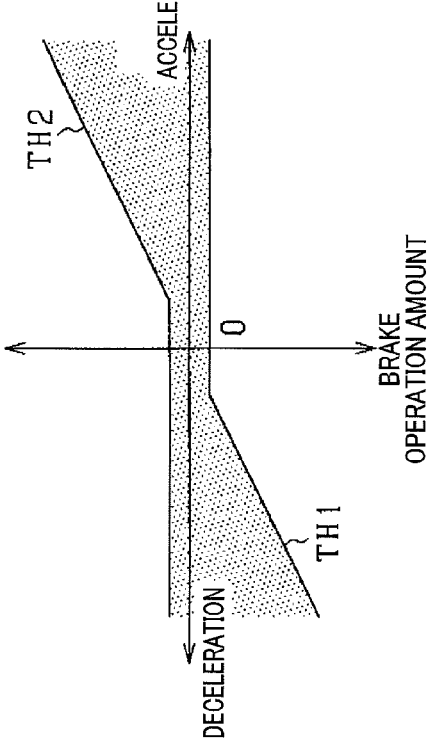

VEHICLE CONTROL APPARATUS

This application claims priority to Japanese Patent Application No. 2014-146399 filed on Jul. 17, 2014, the entire contents of which are hereby incorporated by reference.

BACKGROUND OF THE INVENTION

1. Field of the Invention

The present invention relates to a vehicle control apparatus.

2. Description of Related Art

There is known a technique in which a vehicle is maintained in a coasting state by disengaging the clutch disposed between the engine and the transmission of the vehicle when the accelerator is off for the purpose of increasing fuel economy and so on. For example, refer to Japanese Patent Application Laid-open No. 2011-219087.

However, according to the above conventional technique, the vehicle is returned to the normal running state immediately when it is detected that the vehicle driver has performed a brake operation or an accelerator operation while the vehicle is coasting. Accordingly, it may occur that the vehicle is forcibly returned from the coasting state to the normal running state against the driver's will. In this case, since restoration to the normal running state is made earlier than necessary, fuel economy cannot be increased sufficiently.

In addition, shifting between the normal running state and the coasting state may be made repeatedly depending on the way the vehicle driver performs a brake operation. In this case, there is a concern that vibration occurs in the vehicle due to on/off of the clutch device, causing the vehicle driver or passengers to feel uncomfortable.

SUMMARY

An exemplary embodiment provides a vehicle control apparatus for a vehicle including an engine as a motive power source thereof and a clutch device provided in a power transmission path connected with an output shaft of the engine, including:

a first control section that shifts the vehicle from a normal running state to a coasting state by disengaging the clutch device when a predetermined execution condition is satisfied;

a second control section that releases the coasting state when a brake operation or an accelerator operation is performed by a vehicle driver while the vehicle is in the coasting state; and an operation amount determination section that determines whether or not an operation amount of a brake operation or an accelerator operation performed while the vehicle is in the coasting state exceeds a release threshold, wherein the second control section releases the coasting state if the operation amount is determined to exceed the release threshold, and does not release the coasting state if the operation amount is determined not to exceed the release threshold.

According to the exemplary embodiment, there is provided a vehicle control apparatus that can increase fuel economy of a vehicle and prevent frequent switching between the normal running state and the coasting state of the vehicle.

Other advantages and features of the invention will become apparent from the following description including the drawings and claims.

BRIEF DESCRIPTION OF THE DRAWINGS

In the accompanying drawings:

FIGS. 7A to 7D are diagrams for explaining a brake condition and an accelerator condition to release coasting.

PREFERRED EMBODIMENTS OF THE INVENTION

First Embodiment

Figure 1:
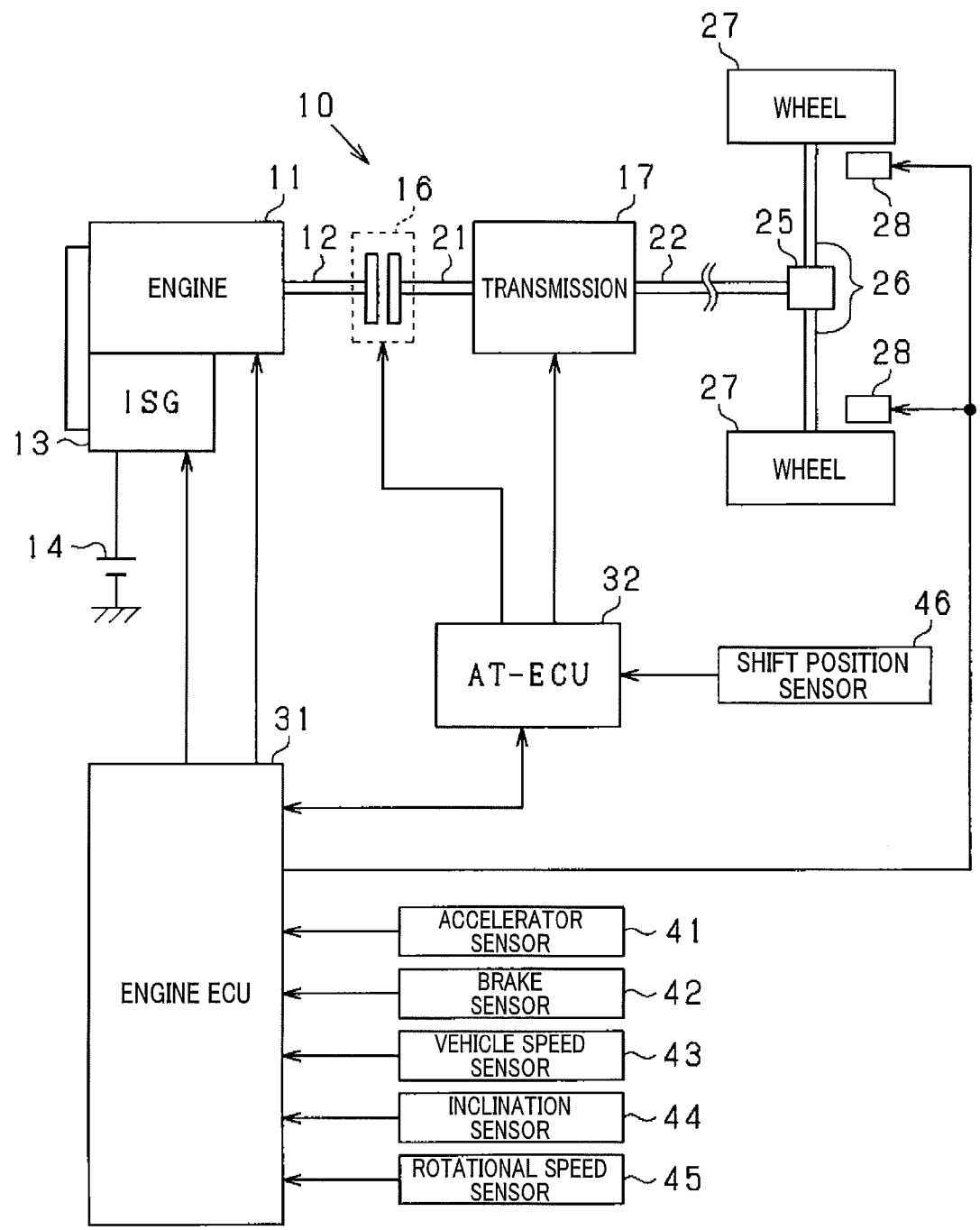
FIG. 1 is a block diagram showing the structure of a vehicle control system including a vehicle control apparatus according to an embodiment of the invention.

FIG. 1 is a block diagram showing the structure of a vehicle control system including a vehicle control apparatus according to an embodiment of the invention. In FIG. 1, the reference numeral 10 denotes a vehicle which runs in a selected one of a normal running mode where its clutch device 16 is engaged to an engine 11 and a coasting mode where the clutch device 16 is disengaged from the engine 11.

The engine 11 is a multi-cylinder internal combustion engine supplied with fuel such as gasoline or light oil, the engine 10 including fuel injection valves and ignition devices. The engine 11 is integrally provided with an ISG (Integrated Starter Generator) 13. The shaft of the ISG 13 is coupled to an engine output shaft 12 of the engine 11 through a belt or the like. Accordingly, the shaft of the ISG 13 is driven to rotate by rotation of the engine output shaft 12, while the engine output shaft 12 is driven to rotate by rotation of the shaft of the ISG 13. That is, the ISG 13 has a generator function for generating electric power (power regeneration function) by rotation of the engine output shaft 12, and a motor function for applying motive power to the engine output shaft 12. To start the engine 11, the engine 11 is applied with initial rotation by rotation of the shaft of the ISG 13.

The ISG 13 is connected with a vehicle mounted battery 14. The ISG 13 operates on the power supplied from the battery 14 which is charged by the power generated by the ISG 13. The power outputted from the battery 14 is used for driving various electrical components mounted on the vehicle.

A transmission 17 is connected to the engine output shaft 12 through the clutch device 16 as a power transmitting device. The clutch device 16 is a friction clutch having a clutch mechanism including a disk (flywheel, for example) connected to the engine output shaft 12 on the side of the engine 11, and a disk (clutch disk, for example) connected to a transmission input shaft 21 on the side of the transmission 17. When these disks are caused to contact with each other, a power transmitting state (clutch engaged state) prevails. In the power transmitting state, transmission of motive power between the engine 11 and the transmission 17 is allowed. When these disks are caused to separate from each other, a power blocking state (clutch disengaged state) prevails. In the power blocking state, transmission of motive power between the engine 11 and the transmission 17 is inhibited. In this embodiment, the clutch device 16 is an automatic clutch which is switched between the clutch engaged state and the clutch disengaged state by an actuator such as a motor. The clutch device 16 may be disposed within the transmission 17.

The transmission 17 is an automatic transmission having a plurality of transmission gear ranges. The transmission 17 receives motive power from the engine 11 through the transmission input shaft 21 and outputs it having been speed-changed in accordance with the vehicle speed, the engine speed and the gear shift position to the transmission output shaft 22. The gear shift position is selected by a shift lever (not shown) operated by the driver of the vehicle. In this embodiment, the gear shift position is at either one of D-range (drive range), R-range (reverse range), and N-range (neutral range). The transmission 17 includes an automatic shift mechanism having an actuator such as a motor or a hydraulic device. In the D-range, gear range shifting is performed automatically.

The transmission output shaft 22 is connected with wheels 27 of the vehicle through a differential gear 25 and a drive shaft (vehicle driving shaft) 26. Each of the wheels 27 is provided with a brake actuator 28 which is driven by a not-shown hydraulic circuit to apply a braking force to the wheel 27. The brake actuator 28 is configured to adjust the braking force applied to the wheel 27 in accordance with the pressure of a not shown master cylinder which transmits a pressing force of a brake pedal to hydraulic oil.

The vehicle control system includes an engine ECU 31 for controlling the operation state of the engine 11 and an automatic transmission ECU (AT-ECU) 32 for controlling the clutch device 16 and the transmission 17. Each of the ECUs 31 and 32 is a microcomputer-based electronic control unit which controls the engine 11 or transmission 17 in accordance with output signals of various sensors. The ECU 31 and the ECU 32 are communicably connected to each other so that they can share various control signals and data signals. In this embodiment, the ECU 31 constitutes the vehicle control apparatus. However, the vehicle control apparatus may be constituted of two or more ECUs.

The various sensors include an accelerator sensor 41 for detecting an amount of pressing of the accelerator pedal, a brake sensor 42 for detecting an amount of pressing of the brake pedal, a vehicle speed sensor 43 for detecting the vehicle speed, an inclination sensor 44 for detecting an inclination angle of a road surface, a rotational speed sensor 45 for detecting the engine speed, and a shift position sensor 46 for detecting the gear shift position of the transmission 17. In this embodiment, the detection signals of the sensors 41 to 45 are inputted to the engine ECU 31, and the detection signal of the shift position sensor 46 is inputted to the AT-ECU 32. Although not shown in the drawings, the vehicle control system includes, other than the above described sensors, a load sensor (airflow meter or suction pressure sensor) for detecting the engine load, a cooling water temperature sensor, an ambient temperature sensor and an atmospheric pressure sensor.

The engine ECU 31 performs various engine control such as control of an amount of fuel injection by the fuel injection valve, control of ignition by the ignition device, control of engine start and power generation by the ISG 13 and control of braking by the brake actuator 28. The AT-ECU 32 performs on-off control of the clutch device 16 and shift control of gear ranges of the transmission 17 based on the detection signals of the various sensors and data transmitted from the engine ECU 31.

The vehicle 10 is capable of shifting to the coasting state by disengaging (turning off) the clutch device 16 to lower fuel consumption when a predetermined coasting condition is satisfied while the vehicle 10 is driven by the motive force of the engine 11.

Figure 2:
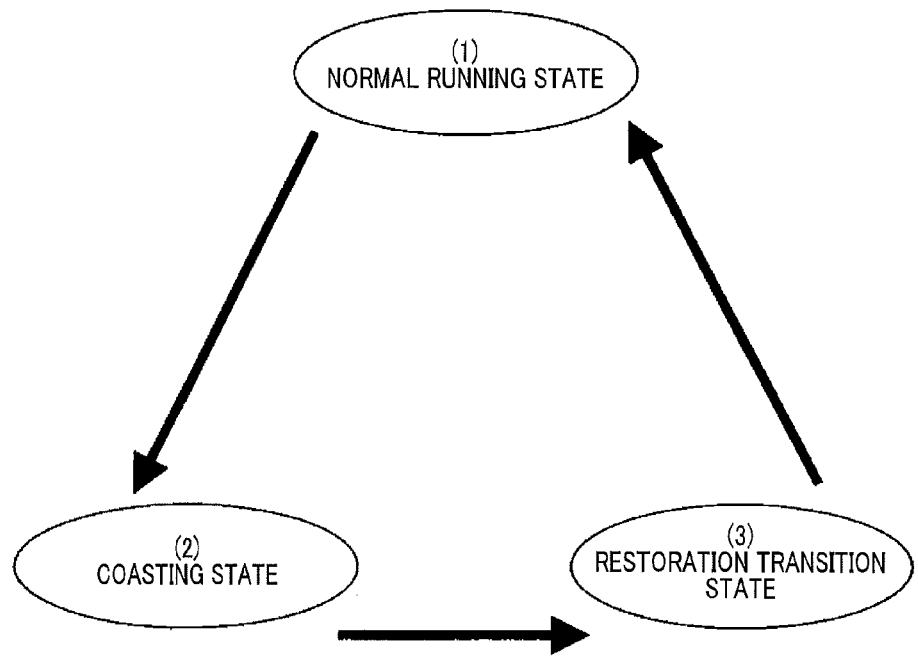
FIG. 2 is a diagram for explaining state transition in a coasting mode.

FIG. 2 is a diagram for explaining state transition (coasting sequence) in the coasting mode.

The coasting sequence proceeds in the order of (1) the normal running state as a basic state, (2) the coasting state, (3) the restoration transition state, and (1) the normal running state. In the normal running state, the vehicle 10 is caused to run in a state in which the engine 11 is operating and the clutch device 16 is engaged with the gear shift position being set by the vehicle driver. In the coasting state, the vehicle 10 is caused to coast in a state in which the engine 11 is stopped and the clutch device 16 is disengaged. The restoration transition state is a state for causing the engine 11 and the clutch device 16 to return to their normal states.

The condition to shift from the normal running state to the coasting state includes that the engine speed is stable above a predetermined speed (idle speed, for example), and includes an execution permission condition. The execution permission condition depends on an environmental condition, a vehicle condition, a power supply condition, an engine condition, and a driver's operation condition.

Specifically:

the environmental condition includes that the ambient temperature is within a predetermined range, and that the atmospheric pressure is within a predetermined range;

the vehicle condition includes that vehicle speed is within a predetermined range (between 40 km/h and 120 km/h, for example), the road surface slope (inclination) is within a predetermined range, the electrical load driving power is smaller than a predetermined value, and no inhibition request comes out from the vehicle control system;

the power supply condition includes that the battery remaining capacity is within a predetermined range, and electric power is not being generated (except a case where a power generation request occurs during coasting), and no inhibition request comes out from the power supply system;

the engine condition includes that the temperature of the engine cooling water is within a predetermined range, the temperature of the transmission hydraulic oil is within a predetermined range, and no inhibition request comes out from the engine system; and the driver's operation condition includes that the shift lever position is in the D-range, a coasting mode setting switch is on, and further includes later-explained brake condition and accelerator condition.

The vehicle 10 is provided with an idling stop function in which the engine ECU 31 automatically stops the engine 11 when a predetermined automatic stop condition is satisfied, and automatically restarts the engine 11 when a predetermined restart condition is satisfied thereafter. The automatic stop condition includes at least one of that acceleration has been turned off (idle state has been reached), that the brake pedal has been depressed, and that the vehicle speed has decreased below a predetermined speed (10 km/h, for example). The restart condition includes that acceleration has been turned on, and that the brake pedal has been released.

Both the execution permission condition to permit coasting and the automatic stop condition to suspend idling stop control include the vehicle speed condition. However, the vehicle speed condition to permit coasting and the vehicle speed condition to suspend idling stop control do not overlap with each other in their ranges.

The condition to shift from the coasting state to the restoration transition state includes at least one of that satisfaction of the execution permission condition has been negated and that an engine start request has occurred. The condition to shift from the restoration transition state to the normal running state includes that engine start has been completed.

Next, the brake condition and the accelerator condition included in the execution permission condition to permit coasting are explained. In this embodiment, the execution permission condition to permit coasting includes that the brake is off (a brake operation amount is zero), and that the accelerator is off (an accelerator operation amount is zero). When a brake operation or an accelerator operation is performed during coasting, the coasting is not immediately released, but only when a brake operation amount or an accelerator operation amount exceeds a predetermined release threshold, the coasting is released. That is, even when a brake operation or an accelerator operation is performed during coasting, the coasting is not released but maintained if the operation is performed slightly, that is, if the operation amount is small.

Figure 3:
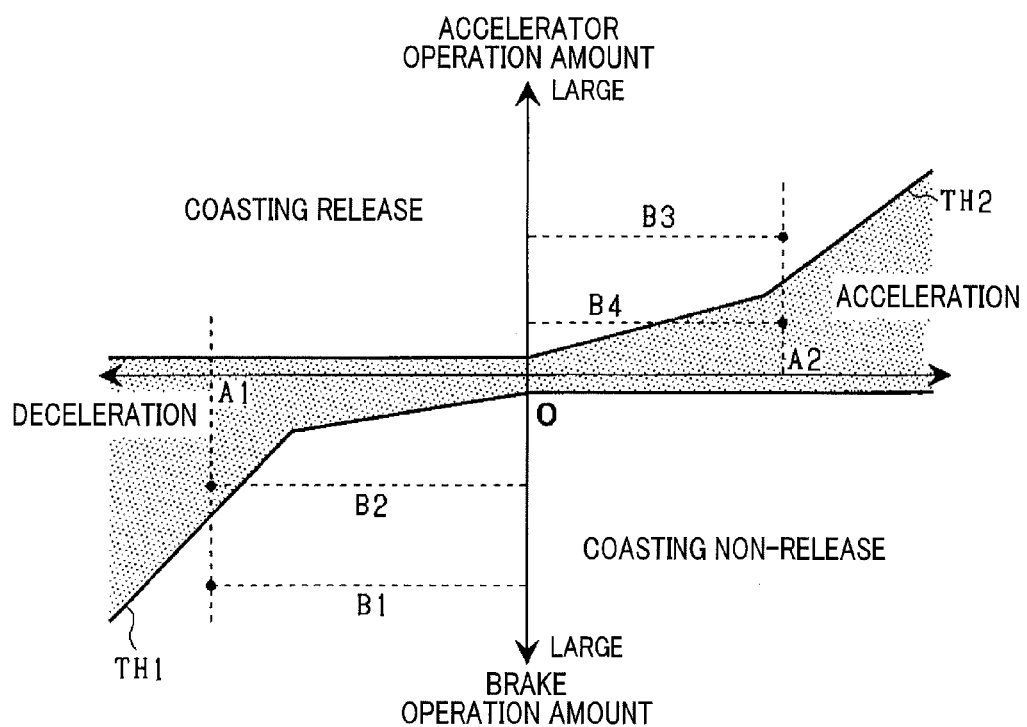
FIG. 3 is a diagram for explaining a brake condition and an macerator condition to release coasting.

FIG. 3 is a diagram for explaining the brake condition and the accelerator condition to release coasting. The lower half of FIG. 3 shows the brake condition. The area in which the brake operation amount≥TH1 is a coasting release area (the non-dotted area). The area in which the brake operation amount<TH1 is a coasting non-release area (the dotted area). The upper half of FIG. 3 shows the accelerator condition. The area in which the accelerator operation amount≥TH2 is a coasting release area (the non-dotted area). The area in which the accelerator operation amount<TH2 is a coasting non-release area (the dotted area).

In the following, the brake condition is explained in more detail. The release threshold TH1 for the case when a brake operation is performed depends on whether the vehicle is accelerating (the acceleration is positive) or the vehicle is decelerating (the acceleration is negative). The release threshold TH1 for the case when the acceleration is negative is larger than that when the acceleration is positive. For the case when the acceleration is negative, the release threshold TH1 increases with the increase of the magnitude of the acceleration. For the case when the acceleration is positive, the release threshold TH1 may be set to zero.

As shown in FIG. 3, when the acceleration of the vehicle 10 has a negative value of A1, the coasting of the vehicle 10 is released if the brake operation amount has a value of B1(≥TH1), and maintained if the brake operation amount has a value of B2(<TH1). That is, as the magnitude of the deceleration increases, the coasting is less easily released.

When the vehicle 10 coasts while decelerating (acceleration being negative), it sometimes occurs that it is not necessary to release the coasting to apply engine brake even if the vehicle driver performs a brake operation, because the vehicle 10 is already in the decelerating state. Therefore, by setting the release threshold TH1 to a larger value for the case when the vehicle 10 decelerates than that for the case when the vehicle 10 accelerates, the coasting control can be performed more appropriately.

Next, the accelerator condition is explained in more detail. The release threshold TH2 for the case when an accelerator operation is performed depends on whether the vehicle is accelerating (the acceleration is positive) or the vehicle is decelerating (the acceleration is negative). The release threshold TH2 for the case when the acceleration is positive is larger than that when the acceleration is negative. For the case when the acceleration is positive, the release threshold TH2 increases with the increase of the magnitude of the acceleration. For the case when the acceleration is negative, the release threshold TH2 may be set to zero.

As shown in FIG. 3, when the acceleration of the vehicle 10 has a positive value of A2, the coasting of the vehicle 10 is released if the brake operation amount has a value of B3(≥TH2), and maintained if the brake operation amount has a value of B4(<TH2). That is, as the magnitude of the acceleration increases, the coasting is less easily released.

When the vehicle 10 coasts while accelerating (acceleration being positive), it sometimes occurs that it is not necessary to release the coasting to further increase the acceleration even if the vehicle driver performs an accelerator operation, because the vehicle 10 is already in the accelerating state. Therefore, by setting the release threshold TH2 to a larger value for the case when the vehicle 10 accelerates than that for the case when the vehicle 10 decelerates, the coasting control can be performed more appropriately.

Figure 4:
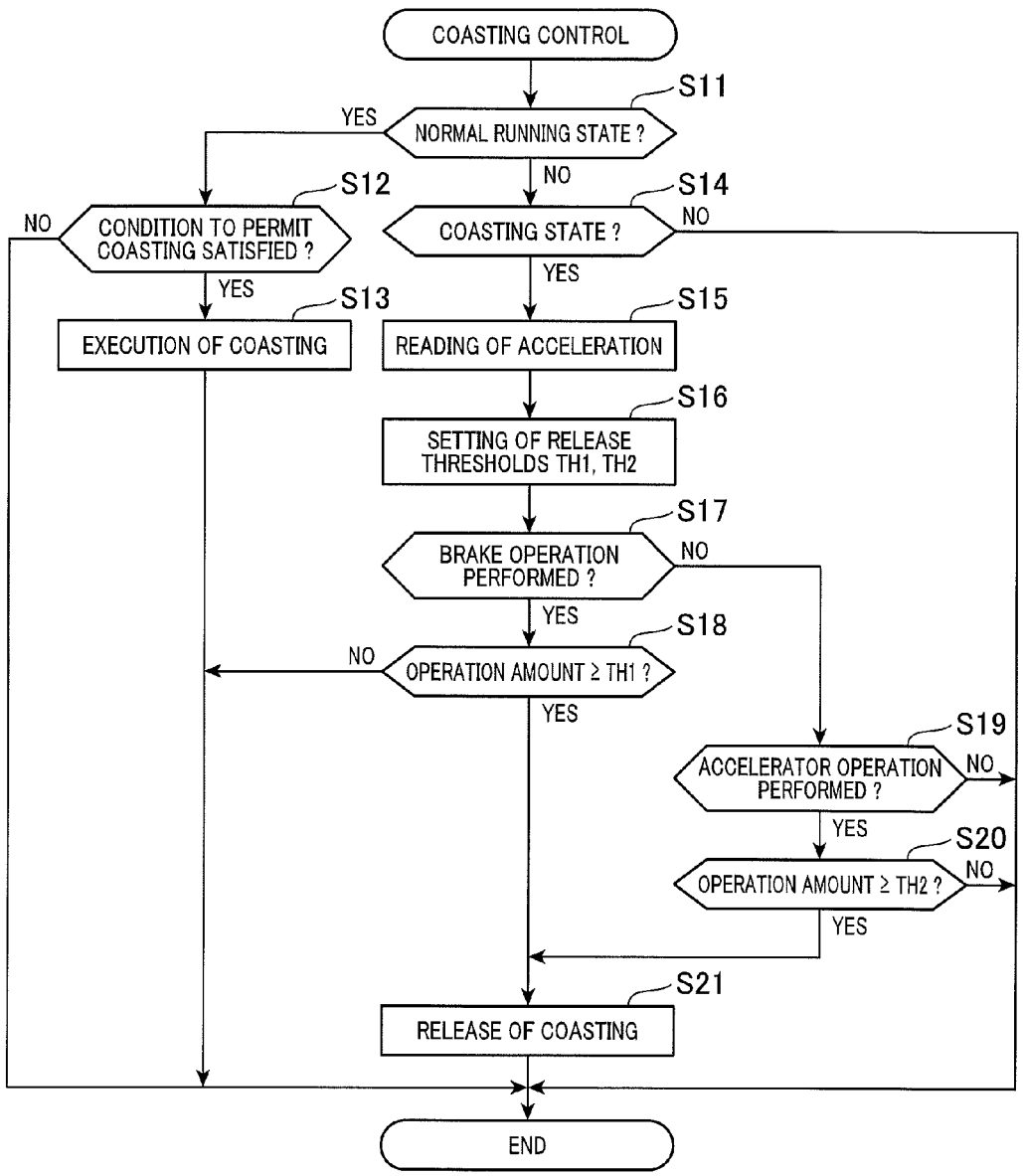
FIG. 4 is a flowchart showing steps of coasting control performed by the vehicle control apparatus.

FIG. 4 is a flowchart showing steps of the coasting control performed by the engine ECU 31.

The coasting control begins in step S11 where it is determined whether or not the vehicle 10 is in the normal running state. If the determination result in step S11 is affirmative, the control proceeds to step S12. In step S12, it is determined whether or not various conditions to permit coasting are satisfied. The various conditions include the above described execution permission condition that includes the brake condition and the accelerator condition. The brake has to be off to satisfy the brake condition, and the accelerator has be off to satisfy the accelerator condition.

If the determination result in step S12 is affirmative, the control proceeds to step S13 to cause the vehicle 10 to shift to the coasting state. That is, the engine 11 is stopped, and the clutch device 16 is disengaged.

If the determination result in step S11 is negative, the control proceeds to step S14 to determine whether or not the current state is the coasting state. If the determination result in step S14 is negative, the control proceeds to step S15 to read in the acceleration of the vehicle 10. The acceleration is obtained by differentiating the measured vehicle speed. In subsequent step S16, the release thresholds TH1 and TH2 are set depending on the acceleration of the vehicle 10 using the relationships shown in FIG. 3.

In subsequent step S17, it is determined whether or not the vehicle driver has performed a brake operation. If the determination result in step S17 is affirmative, the control proceeds to step S18. In step S18, it is determined whether or not the current brake operation amount is larger than the release threshold TH1. If the determination result in step S18 is affirmative, the control proceeds to step S21 to release the coasting and cause the vehicle 10 to shift to the normal running sate.

If the determination result in step S17 is negative, the control proceeds to step S19 to determine whether or not an accelerator operation has been performed by the vehicle driver.

If the determination result in step S19 is affirmative, the control proceeds to step S20. In step S20, it is determined whether or not the current acceleration operation amount is larger than the release threshold TH2. If the determination result in step S20 is affirmative, the control proceeds to step S21 to release the coasting and cause the vehicle 10 to shift to the normal running sate.

If the determination result in step S18 or step S20 is negative, the control is terminated without releasing the coasting regardless of whether a brake operation or an accelerator operation has been performed or not.

Figure 5:
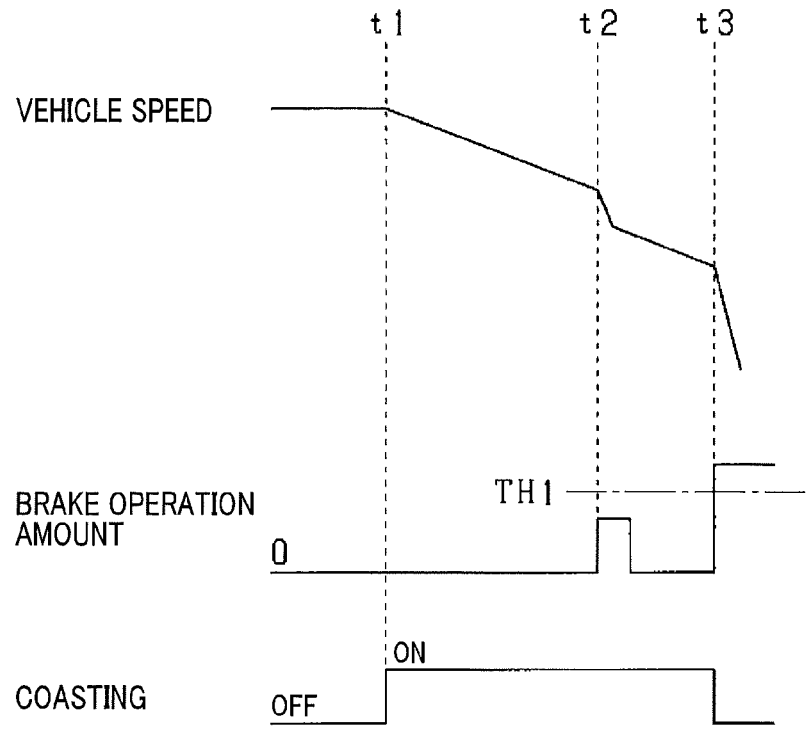
FIG. 5 is a time chart for explaining an example of coasting of a vehicle provided with the vehicle control system.

FIG. 5 is a time chart for explaining an example of coasting of the vehicle 10. In this example, the vehicle 10 is assumed to be running on an uphill road.

The vehicle 10 is in the normal running state before time t1, and starts coasting at time t1 when the conditions to permit coasting are satisfied. After time ti1, the vehicle speed decreases gradually. Since the vehicle 10 is running on the uphill road, the vehicle speed decreases at a negative acceleration depending on the slope of the uphill road.

The vehicle driver performs a brake operation at time t2. The release threshold TH1 for a case of a brake operation being performed is set depending on the vehicle acceleration. In this example, since the brake operation amount is smaller than the release threshold TH1, the coasting is not released. Thereafter, the brake operation amount reaches the release threshold TH1 at time t3, as a result of which the coasting is released. From time t3 on, the vehicle 10 runs in the normal running state in which the engine is in operation, and the clutch device 16 is engaged.

The above described embodiment of the invention provides the following advantages.

It is determined whether or not a brake operation amount or an accelerator operation amount exceeds the release threshold TH1 or TH2 during coasting. Only when the determination result is affirmative, the coasting is released. This makes is possible to make shift from the coasting state to the normal running state in accordance with the vehicle driver's will to decelerate or accelerate the vehicle.

If the operation amount is determined to be smaller than the threshold TH1 or TH2, the coasting is not released. Accordingly, since the coasting is continued when the vehicle driver performs a brake operation or an accelerator operation only slightly, it is possible to suppress reduction of fuel economy. Further, it is possible to suppress frequent switching between the normal running state and the coasting state. Hence, according to the above described embodiment, it is possible to increase fuel economy and to suppress inconvenience due to frequent state switching.

Normally, there is a difference in a way the vehicle driver performs a brake operation or an accelerator operation between when the acceleration of the vehicle 10 is positive and when it is negative, and also between when the acceleration of the vehicle 10 is large and when it is small. According to this embodiment, since the release thresholds TH1 and TH2 are set variably depending on the acceleration of the vehicle 10, the coasting of the vehicle can be maintained appropriately even when a brake operation or an accelerator operation is performed.

The release threshold TH1 for the case of a brake operation being performed is set larger when the vehicle 10 is decelerating than when the vehicle 10 is accelerating during coasting. The release threshold TH1 is set larger while the vehicle 10 decelerates during coasting when the magnitude of the deceleration is larger. When the vehicle 10 is actually decelerating, since the driver's will to reduce the vehicle speed by a brake operation is being fulfilled to some extent, the vehicle 10 can be controlled to coast appropriately while satisfying the requirement to reduce the vehicle speed by setting the release threshold TH1 depending on the magnitude of the deceleration.

The release threshold TH2 for the case of an accelerator operation being performed is set larger when the vehicle 10 is accelerating than when the vehicle 10 is decelerating during coasting. The release threshold TH2 is set larger while the vehicle 10 accelerates during coasting when the magnitude of the acceleration is larger. When the vehicle 10 is actually accelerating, since the driver's will to increase the vehicle speed by an accelerator operation is being fulfilled to some extent, the vehicle 10 can be controlled to coast appropriately while satisfying the requirement to increase the vehicle speed by setting the release threshold TH2 depending on the magnitude of the acceleration.

When the vehicle 10 coasts on an uphill road, the vehicle 10 decelerates since a negative acceleration occurs depending on the slope of the uphill road. When the vehicle 10 coasts on a downhill road, the vehicle 10 accelerates since a positive acceleration occurs depending on the slope of the downhill road. In these cases, if the coasting is released in accordance with a brake operation or an acceleration operation even though the vehicle 10 is already decelerating or accelerating, coasting is started and ended repeatedly. According to the above described embodiment, such an undesirable situation can be avoided.

Second Embodiment

Figure 6:
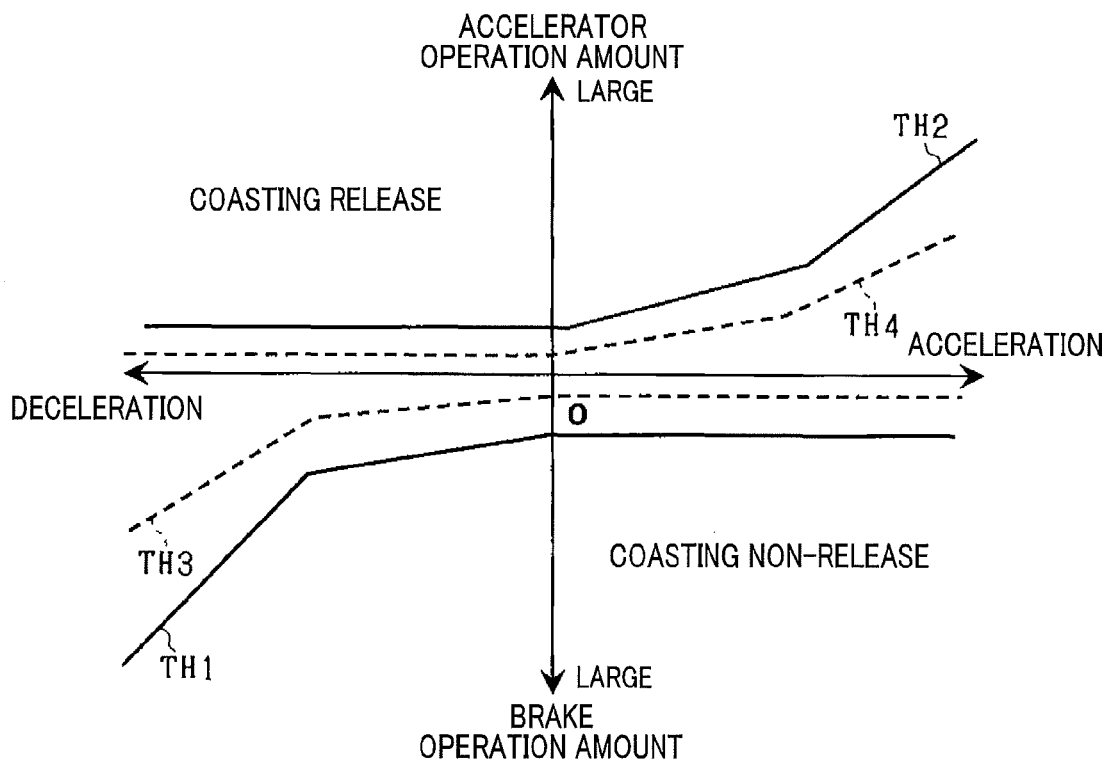
FIG. 6 is a diagram for explaining a brake condition and an macerator condition to permit or release coasting.

Next, a second embodiment of the invention is described. In the second embodiment, in addition to the release thresholds TH1 and TH2 to release coasting, permission thresholds TH3 and TH4 to permit coasting are variably set. FIG. 6 is a diagram for explaining a brake condition and an accelerator condition to permit or release coasting. In FIG. 6, the release thresholds TH1 and TH2 are shown by solid lines, and the permission thresholds TH3 and TH4 are shown by broken lines.

The lower half of FIG. 3 shows the brake condition. The release threshold TH1 for the case of a brake operation being performed is set larger than the permission threshold TH3 for the case of a brake operation being performed. The area in which a brake operation amount≥TH1 is a coasting release area. The area in which a brake operation amount≤TH3 is a coasting permission area. The permission threshold TH3 depends on whether the vehicle 10 is accelerating (the acceleration is positive) or the vehicle 10 is decelerating (the acceleration is negative) like the release threshold TH1. The permission threshold TH3 for the case when the acceleration is negative is larger than that when the acceleration is positive. For the case when the acceleration is negative, the permission threshold TH3 increases with the increase of the magnitude of the acceleration.

The upper half of FIG. 6 shows the accelerator condition. The release threshold TH2 for the case of an accelerator operation being performed is set larger than the permission threshold TH4 for the case of an accelerator operation being performed. The area in which the accelerator operation amount≥TH2 is a coasting release area. The area in which the accelerator operation amount≤TH4 is a coasting permission area. The permission threshold TH4 depends on whether the vehicle is accelerating (the acceleration is positive) or the vehicle is decelerating (the acceleration is negative) like the release threshold TH2. The permission threshold TH4 for the case when the acceleration is positive is larger than that when the acceleration is negative. For the case when the acceleration is positive, the permission threshold TH4 increases with the increase of the magnitude of the acceleration.

The engine ECU 32 variably sets the permission thresholds TH3 and TH4 based on the relationships shown in FIG. 6, and determines whether or not the brake operation amount or the accelerator operation amount is smaller than the permission amount TH3 or TH4 during the normal running state before a shift to the coasting state is made. If this determination result is affirmative, coasting is permitted, and otherwise inhibited.

According to the second embodiment, the vehicle 10 is more likely to shift to the coasting state when the vehicle 10 is decelerating even if a brake operation is performed, and when the vehicle 10 is accelerating even if an accelerator operation is performed. Hence, according to the second embodiment, it is possible to appropriately perform the coasting control in accordance with the running state of the vehicle 10 taking into account the vehicle driver's will.

Other Embodiments

It is a matter of course that various modifications can be made to the above embodiments as described below.

The brake condition and the accelerator condition to release coasting or to permit coasting are not limited to those determined based on the relationships shown in FIGS. 3 and 6. They may be modified as necessary. For example, the release thresholds TH1 and TH2 may be set based on the relationships shown in FIGS. 7A to 7D. In each of FIGS. 7A to 7D, the dotted area is a coasting release area, and the non-dotted area is a coasting non-release area. In the case of FIG. 7B, the release threshold TH1 is set to zero for the case when the acceleration is positive, and the release threshold TH2 is set to zero for the case when the acceleration is negative. In the case of FIG. 7D, each of the release thresholds TH1 and TH2 is set to a constant value other than zero.

In the above embodiments, the release thresholds TH1 and TH2 are variably set depending on the acceleration of the vehicle 10. Instead, the release thresholds TH1 and TH2 may be variably set depending on the vehicle speed of the vehicle 10.

Figure 8A:
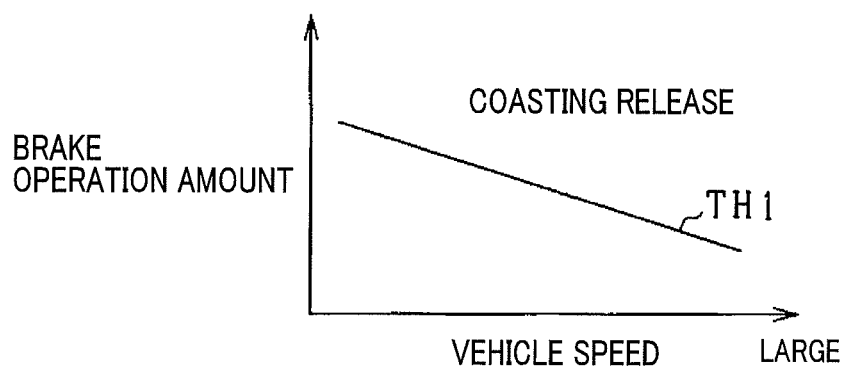
FIGS. 8A and 8B are diagrams for explaining a brake condition and an accelerator condition to release coasting.
Figure 8B:
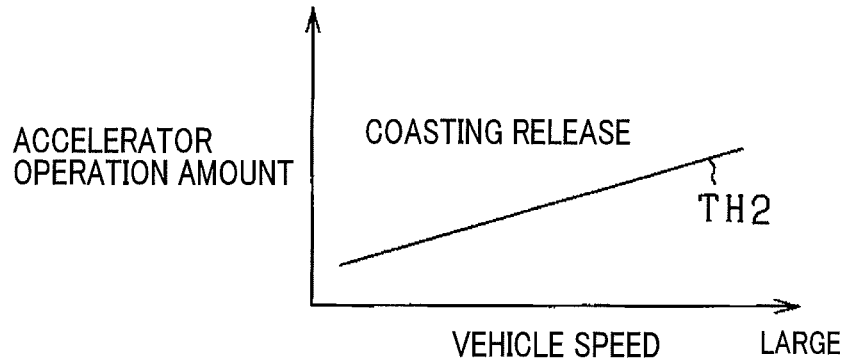

For example, they may be set based on the relationships shown in FIG. 8A or FIG. 8B.

In the case of FIG. 8A, the release threshold TH1 for the case of a brake operation being performed is set larger when the vehicle speed is smaller. This is because, normally, it is less required to release coasting to apply an engine brake in response to a brake operation by the vehicle driver when the vehicle speed is smaller than when the vehicle speed is larger. Therefore, by setting the release threshold TH1 for the case of a brake operation being performed larger when the vehicle speed is smaller, the coasting control can be performed appropriately satisfying a required speed of the vehicle 10.

In the case of FIG. 8B, the release threshold TH2 for the case of an accelerator operation being performed is set larger when the vehicle speed is larger. This is because, normally, it is less required to release coasting to increase the vehicle speed in response to an accelerator operation by the vehicle driver when the vehicle speed is larger than when the vehicle speed is smaller. Therefore, by setting the release threshold TH2 for the case of an accelerator operation being performed larger when the vehicle speed is larger, the coasting control can be performed appropriately satisfying a required speed of the vehicle 10.

The permission thresholds TH3 and TH4 may be variably set depending on the vehicle speed of the vehicle 10. In this case, the permission threshold TH3 for the case of a brake operation being performed is set larger when the vehicle speed is smaller, and the permission threshold TH4 for the case of an accelerator operation being performed is set larger when the vehicle speed is larger.

In the above embodiments, the engine 11 is stopped and the clutch device 16 is disengaged when the vehicle 10 is in the coasting state. However, the engine 11 may be set in the operating state (in the idle state, for example) with the clutch device 16 being disengaged when the vehicle 10 is in the coasting state. In this case, when the accelerator operation amount is smaller than the release threshold TH2 and the coasting is not permitted, it is preferable that the engine is prevented from racing in response to the accelerator operation. Specifically, it is preferable that the engine ECU 31 does not open the throttle valve (does not increase an air flow rate) regardless of accelerator operation data received.

This is because the engine may race up unnecessarily due to an accelerator operation during coasting because the coasting is not released if the accelerator operation amount is smaller than the release threshold TH2.

One of the release threshold TH1 for the case of a brake operation being performed and the threshold TH2 for the case of an accelerator operation being performed may be set variably depending on the acceleration or speed of the vehicle 10, and the other may be set to zero.

The above explained preferred embodiments are exemplary of the invention of the present application which is described solely by the claims appended below. It should be understood that modifications of the preferred embodiments may be made as would occur to one of skill in the art.

What is claimed is:

1. A vehicle control apparatus for a vehicle including an engine as a motive power source thereof and a clutch device provided in a power transmission path connected with an output shaft of the engine, comprising:
    a first control section that shifts the vehicle from a normal running state to a coasting state by disengaging the clutch device when a predetermined execution condition is satisfied;
    a second control section that releases the coasting state when a brake operation or an accelerator operation is performed by a vehicle driver while the vehicle is in the coasting state; and
    an operation amount determination section that determines whether or not an operation amount of a brake operation or an accelerator operation performed while the vehicle is in the coasting state exceeds a release threshold, wherein
    the second control section releases the coasting state if the operation amount is determined to exceed the release threshold, and does not release the coasting state if the operation amount is determined not to exceed the release threshold.

2. The vehicle control apparatus according to claim 1, further comprising a setting section that variably sets the release threshold depending on an acceleration or a speed of the vehicle.

3. The vehicle control apparatus according to claim 2, wherein
    the second control section releases the coasting state in response to a brake operation performed while the vehicle is in the coasting state, and
    the setting section sets the release threshold for a case of a brake operation being performed in accordance with an acceleration or a deceleration of the vehicle in the coasting state such that the release threshold is larger when the vehicle is decelerating than when the vehicle is accelerating.

4. The vehicle control apparatus according to claim 3, wherein, when the vehicle coasts while decelerating, the setting section set the release threshold to a larger value for the case of a brake operation being performed when the deceleration is larger.

5. The vehicle control apparatus according to claim 2, wherein
    the second control section releases the coasting state in response to an accelerator operation performed while the vehicle is in the coasting state, and
    the setting section sets the release threshold for a case of an accelerator operation being performed in accordance with an acceleration or a deceleration of the vehicle in the coasting state such that the release threshold is larger when the vehicle is accelerating than when the vehicle is decelerating.

6. The vehicle control apparatus according to claim 5, wherein, when the vehicle coasts while accelerating, the setting section set the release threshold to a larger value when the acceleration is larger.

7. The vehicle control apparatus according to claim 2, wherein the second control section releases the coasting state in response to a brake operation performed while the vehicle is in the coasting state, and the setting section sets the release threshold for a case of a brake operation being performed in accordance with a speed of the vehicle in the coasting state such that the release threshold is larger when the speed of the vehicle is smaller.

8. The vehicle control apparatus according to claim 2, wherein the second control section releases the coasting state in response to an accelerator operation performed while the vehicle is in the coasting state, and the setting section sets the release threshold for a case of an accelerator operation being performed in accordance with a speed of the vehicle in the coasting state such that the release threshold is larger when the speed of the vehicle is larger.

9. The vehicle control apparatus according to claim 1, wherein the operation amount determination section includes a section for determining whether or not an operation amount of a brake operation or an accelerator operation performed during the normal running state is smaller than or equal to a predetermined permission threshold, the first control section permitting a shift from the normal running state to the coasting state if the operation amount is determined to be smaller than or equal to the permission threshold, and not permitting the shift from the normal running state to the coasting state if the operation amount is determined to be larger than the permission threshold, the vehicle control apparatus further comprising a setting section that variably sets the permission threshold depending on an acceleration or a speed of the vehicle.

10. The vehicle control apparatus according to claim 1, wherein the first control section shifts the vehicle to the coasting state by disengaging the clutch device and keeping the engine in operation, and the second control section release the coasting state in response to an accelerator operation performed during the coasting state, the vehicle control apparatus further comprising a section that causes the engine not to race up in response to an accelerator operation performed during the coasting state, if the operation amount is determined not to exceed the release threshold and the coasting state is not released.

* * * * *